Aug. 11, 1953      R. I. HAHN ET AL      2,648,384
APPARATUS FOR CUTTING TUBING
Original Filed Aug. 7, 1948      4 Sheets-Sheet 3

INVENTOR.
Rea I. Hahn and Bernard E. Frank
BY
Spencer Hardman & Fehr
their attorneys

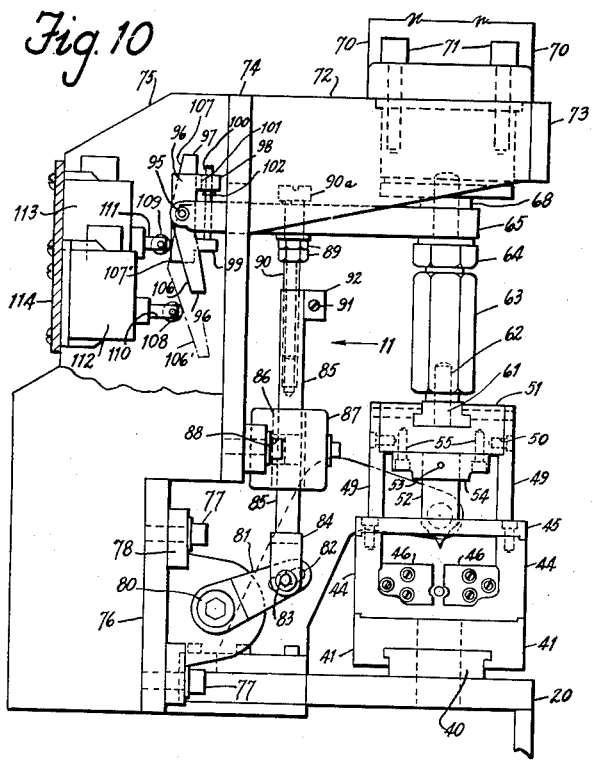

Patented Aug. 11, 1953

2,648,384

UNITED STATES PATENT OFFICE 2,648,384

APPARATUS FOR CUTTING TUBING

Rea I. Hahn and Bernard E. Frank, Rochester, N. Y., assignors to General Motors Corporation, Detroit, Mich., a corporation of Delaware Continuation of application Serial No. 43,103, August 7, 1948. This application February 18, 1950, Serial No. 144,976

4 Claims. (Cl. 164—49)

This invention relates to apparatus for cutting tubing into lengths.

An object of the invention is to provide a machine which will automatically cut tubing into desired lengths without stopping operation of the feed mechanism. The tubing is fed through the cutter unit into engagement with a lever which is moved laterally by the tubing to effect closing of an electric switch which causes the cutter to operate and the lever to move to a position above the tubing whereupon a spring moves the lever laterally in a direction opposite to tubing movement in consequence of which the cut tubing is moved under the lever by the uncut tubing until the cut tubing clears the cutter unit whereupon it gravitates from the machine.

Further objects and advantages of the present invention will be apparent from the following description, reference being had to the accompanying drawings wherein a preferred embodiment of the present invention is clearly shown.

In the drawings:

Figs. 1, 3 and 7 together constitute a front view of the machine;

Figs. 2, 4 and 8 taken together constitute a plan view;

Fig. 5 on the same sheet with Figs. 3 and 4 is a wiring and piping diagram;

Fig. 6 is a sectional view on line 6—6 of Fig. 8;

Fig. 9 is a view in the direction of arrow 9 of Fig. 7 and is partly in section on line 9—9;

Fig. 10 is a view in the direction of arrow 10 of Fig. 1;

Fig. 11 is a view in the direction of arrow 11 of Fig. 10;

Fig. 12 is a view in the direction of arrow 12 of Fig. 11; and

Fig. 13 is a sectional view on line 13—13 of Fig. 1.

Figure 1:
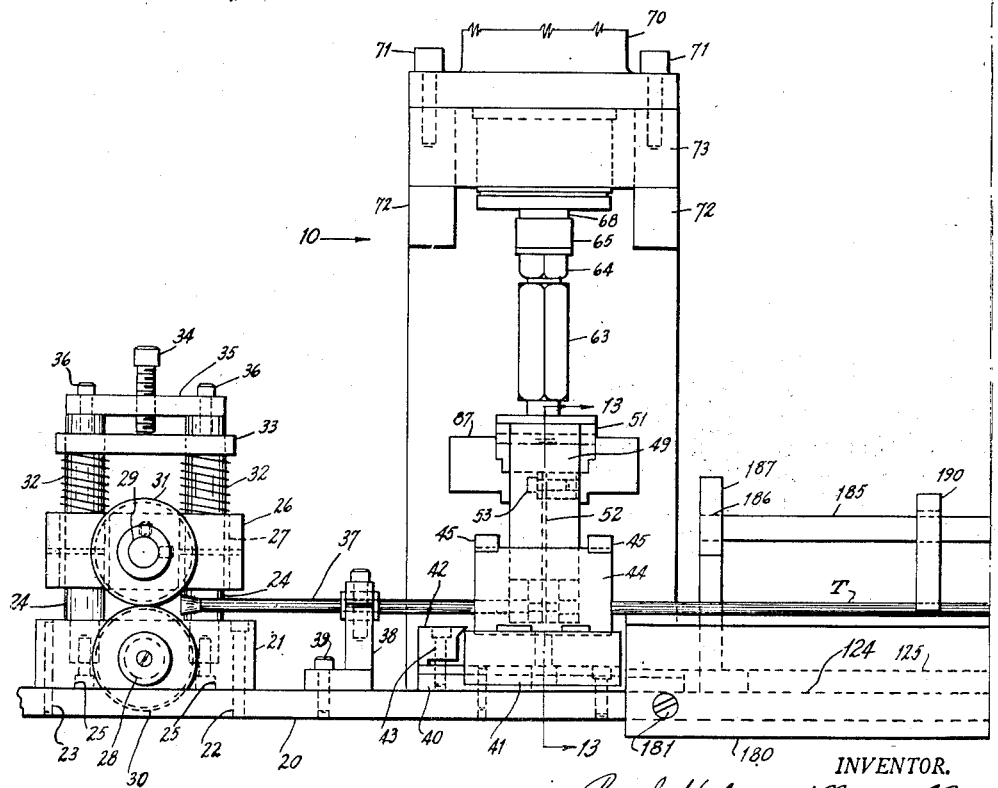
Figure 4:
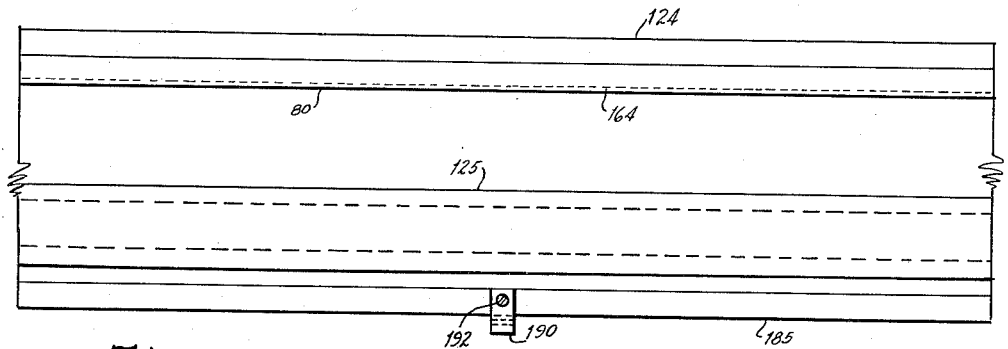

A base 20 (Fig. 1) supports a feed unit comprising a block 21 attached thereto by screws 22 and dowels 23. Block 21 supports rods 24 attached thereto by screws 25. Rods guide a vertically movable block 26 having bushings 27 which slide on the rods 24. Blocks 21 and 26 support shafts 28 and 29 respectively which are attached to grooved rollers 30 and 31 respectively. Shaft 28 is connected in any suitable manner with a source of mechanical power, not shown. The grooved rollers 30 and 31 receive tubing between them and the roller 31 is urged toward the roller 30 by springs 32 surrounding the rods 24 and confined under compression by a plate 33, also guided by the rods 24 and held down by a screw 34 threaded through a bar 35 which screws 36 attach to rods 24. The tubing passing through to the right from the rollers 30, 31 is received by a guide tube 37 supported by bracket 38 attached by screws 39 to the base 20.

Referring also to Figs. 10 and 13, base 20 supports cutter unit comprising a guide plate 40 along with a cutter base block 41 which is adjustable and is secured in the desired position of adjustment by a clamp 42 (Fig. 1) fastened to a plate 40 by screws 43. Block 41 supports a frame comprising side members 44 and top members 45. This frame provides guides for horizontally movable blocks 46 (Fig. 13) carrying pairs of tubing clamping jaws 47. The blocks 46 are urged apart by springs 48 and into engagement with cam bars 49 which screws 50 attach to a block 51. A cutter blade 52 is attached by a screw 53 to a plate 54 which screws 55 attach to the block 51. Block 51 has a T-slot 60 for receiving a T-head 61 to which a screw stud 62 is attached. A coupling screw 63 is received by a nut 64 and passes through a plain hole in a bar 65. Screw 63 connects the stud 62 with a rod 68 which is connected with a piston in a cylinder 70 which screws 71 attach to a bracket comprising side plates 72 and an end plate 73. Side plates 72 are welded to a plate 74 which is part of a frame which comprises side plates 75 connected also by a plate 76. Screws 77 attach to plate 76 a bracket 78 providing a bearing for a shaft 80 which carries a lever 81 having a slot 82 receiving a pin 83 carried by a clevis 84 on the lower end of a rod 85 which is guided by a bearing sleeve 86 retained by a bracket 87 which screws 88 attach to the plate 74. The rod 85 is tapped to receive a screw 90 (Fig. 10) receiving nuts 89 and having a shank which passes through the plate 65 and having a slotted head 90a by which the screw can be turned in order to adjust the position of the rod 85 relative to the plate 65. When this adjustment has been made, a clamping screw 91 is tightened. Screw 91 passes through ears 92 (Fig. 11) of the rod 85, said ears being separated by a saw cut 93 in the rod 85.

Plate 65 carries a pin 95 (Fig. 10) providing a fulcrum for adjustable cam plates 96 and 97 each of which has lugs 98 and 99, the two lugs of a lever being in vertical alignment. Each of the levers can be adjusted about its pivot by screw 100 passing through a notch 101 in lug 98 and having threaded engagement with the plate 65 and engageable with the lug 99. Each screw has a collar 102 bearing against the lower side of the lug 98. Therefore the screw can not move axially relative to the lug; and, when it is turned, the angular position relative to plate 65 of the cam plate associated therewith can be changed. The plate 96 has a camming surface 106 which during downward movement of the plate 65 will move into the position 106' thereby causing left movement of a roller 108 carried by the actuating plunger 110 of a switch 112 mounted on a plate 114 attached to the frame plate 75. Plate 114 carries also a switch 113 having an actuating plunger 111 which carries a roller 109 engaged as shown in Fig. 10 by the cam plate 97. When the plate 65 moves down to cause the cam surface 107 of plate 97 to move into the position 107' the switch plunger 111 moves to the right to allow switch 113 to close at a time after the left movement of roller 108 has caused switch 112 to close.

Shaft 80, which may be of a length somewhat longer than the longest length of the tubing to be cut by the machine, is supported at its right end (Fig. 8) by a bearing bracket 120 (also Fig. 9) attached by screws 121 to a plate 122 which is attached by screws 123 to a base plate 124 which supports a plate 125 of dovetail contour. Plate 125 (Fig. 6) provides a guide for a plate 126 which can be attached to the plate 125 in the desired position by screws 127 (Fig. 7). The fine adjustment of plate 126 along the bar 125 is obtained by turning a screw 128 having threaded engagement with the plate 126 and passing through a plain hole in a bracket 129 which is guided by the bar 125 and secured thereto by screws 130. To prevent endwise movement of the screw 128 relative to the bracket 129, a collar 131 is attached to the screw by a pin 132.

Plate 126 provides integral brackets 133 enclosing bearings 134 retained by plates 135 attached to the bracket. Bearings 134 support a rod or shaft 136 to which a pin 137 attaches a gear 138. Shaft 136 is urged to the left by a spring 139 confined between the gear 138 and a thrust bearing 140 thereby locating the shaft 136 so that a collar 141 attached thereto is spaced slightly to the left of the adjacent plate 135. The shaft 136, which is axially movable, carries a screw 142 which is fixed in the desired position of adjustment by lock nut 143. The head of the screw 142 is engageable with a plunger 144 of a switch 145 mounted on the plate 126. The shaft 136 carries a stop lever or abutment 146 which is located normally in a position to be engaged by the right end of tubing T as it moves toward the right in Fig. 7.

The gear 138 meshes with a rack 150 which is guided by two plates 151 attached by screws 152 to the plate 126. The rack 150 has a downwardly extending portion 153 to which a pin 154 is attached. A spring 155 connects the pin 154 with a screw 156 attached to the plate 126. This spring urges the rack 150 to the left (Fig. 6) said movement being stopped by engagement with the frame 126 by a screw 157 threaded through the part 153 and secured in adjusted position by lock nut 158. The left end of the rack 150 is bifurcated to receive a roller 160 pivoted on a pin 159 carried by the rack. Roller 160 is engageable with a cam 161 having a hub 162 through which the shaft 80 extends. The hub 162 is connected with shaft 80 by a key 163 received by a longitudinal groove 164 extending about the full length of the shaft 80 so that the cam 161 can be located in cooperative relation with the roller 160 which is located in a position determined by the length of tubing to be cut off.

Figure 5:
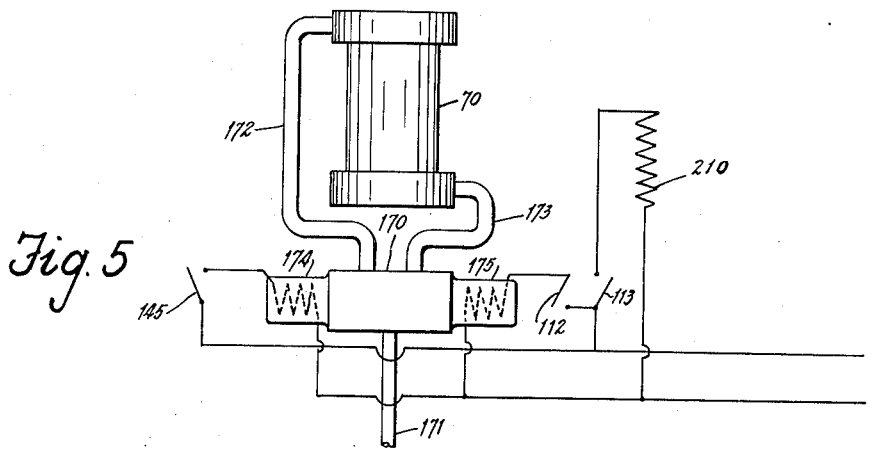
Figure 3:
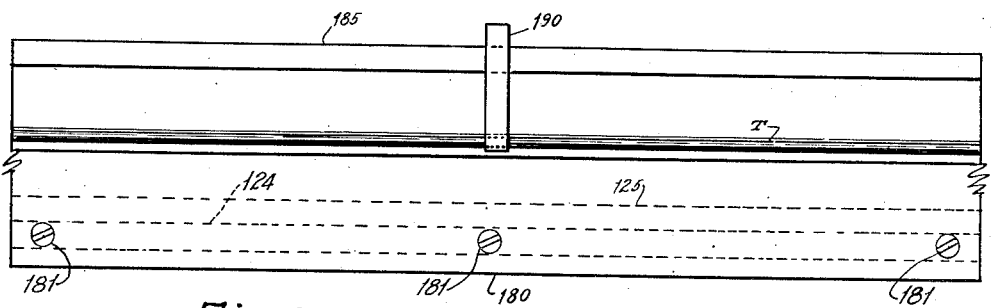

Referring to Fig. 5, the admission of pressure fluid to the ends of cylinder 70 is controlled by a valve 170 connected with inlet pipe 171 and connectible with outlet pipes 172 and 173. The valve 170 is controlled by solenoids 174 and 175 which are respectively energized by the closing of switches 145 (Fig. 7) and 112 (Fig. 10). When the tubing, which is fed through the cutter by the feed wheels 30 and 31 and which is supported on the upper flange of an angle bar 180 which screws 181 (Figs. 1 and 3) secure to the base plate 124, engages the lever 146, the shaft 136 is moved to the right to move to the right the operating plunger 144 of switch 145 thereby effecting the closing of the switch 145 thereby energizing solenoid 174 (Fig. 5) which so conditions the valve 170 that pressure fluid is admitted to the upper end of cylinder 70, and the piston rod 68 moves down thereby causing, through the coaction of cam plates 49 with the blocks 46, the gripping of the tubing by the pairs of jaws 147 located on opposite sides thereof and adjacent to the cutter blade 52 and thereby causing the cutter blade 52 to descend and shear away the tubing between the pairs of jaws 47, said sheared piece descending through holes in the members 41, 40 and 20. Downward motion of the piston rod 68 also causes clockwise rotation of shaft 80 as viewed in Figs. 10 and 6 thereby causing the rack 150 to move to the right and the stop lever or abutment 146 to move counterclockwise or up in order to clear the right end of the cut tubing T (Fig. 7). As soon as levers 146 move up, the spring 139 pushes the shaft 136 toward the left so that lever 146 moves to the left and above the tubing T. Switch 145 then opens due to release of its plunger 144.

Downward movement of the piston rod 68 also causes, after the tubing is cut, the closing of switch 112 due to the coaction between surface 106 of the cam plate 96 and the roller 108 (Fig. 10). Switch 145 having been opened when shaft 136 moves left, when switch 112 is closed the solenoid 175 is energized to so condition the valve 170 as to admit pressure fluid to the lower end of cylinder 70 whereupon the piston in cylinder 70 rises and the parts returned to normal position. As soon as the blade 52 clears the tubing, movement of the tubing by the feed rollers is resumed so that the cut tubing is pushed by the uncut tubing to the right and under the stop lever 146 which does not return immediately to downward position since it rests upon the cut tubing.

Figure 2:
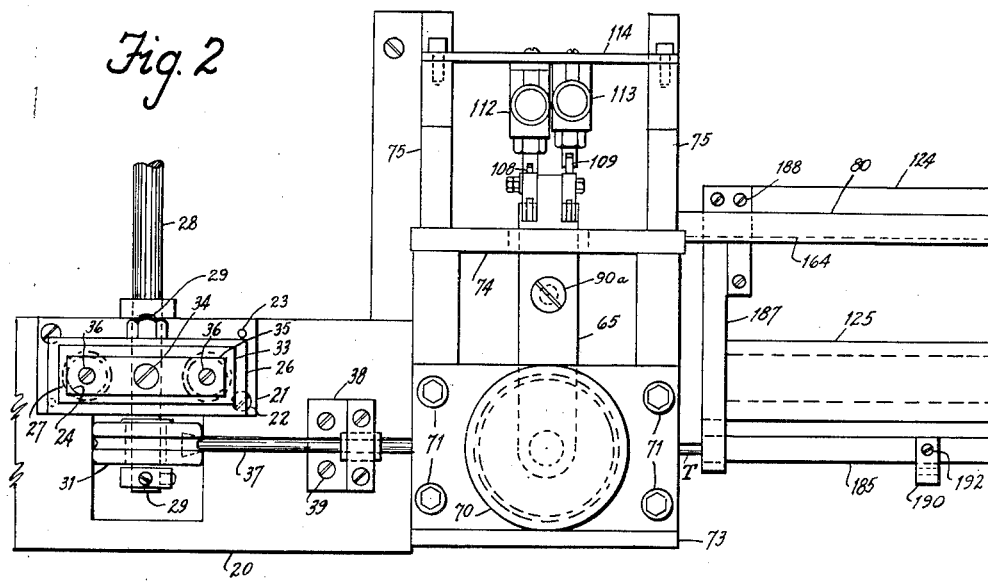

The cut tubing is automatically ejected by a mechanism which comprises a square shaft 185 having cylindrical journals 186 (Figs. 7 and 1) supported respectively by the plate 122 and a bracket 187 which screws 188 (Fig. 2) attach to a plate 124. Shaft 185 supports a plurality of ejector levers 190 (Fig. 9) each having a notch 191 for receiving the square shaft 185 and each clamped thereon in the desired location by a set screw 192. Each lever 190 has a notch 193 (Fig. 9) receiving the tubing T. A lever 195 has a notch 194 to receive the shaft 185 as shown in Fig. 9. Lever 195 is attached to the shaft 185 by a clamping plate 196 secured to the lever 195 by screws 197. Lever 195 carries a screw 198 connected by a spring 199 with a screw 200 attached to a plate 201 supported by the base 124 and the plate 122. The spring 199 urges the lever 195 counterclockwise so that the ejector levers 190 will be located in the proper position to receive the tubing. Motion of the lever 195 counterclockwise is limited by its engagement with a stop screw 203 (Fig. 7) supported by a bracket 202 attached by screws 204 to the plates 122. Plate 201 provides brackets 205 to which clips 206 are attached by screws 207. Clips 206 are fastened by rivets 208 to a laminated magnetizable frame 209 which supports a solenoid magnet coil 210 surrounding a central core 211 (Fig. 9) of the frame 209. Core 211 has a hole therethrough to receive a rod 212 having threaded connection with a bent rod 213 pivotally connected with the lever 195. The rod 212 supports a solenoid armature 215. The coil 210 is energized by the closing of switch 113 (Fig. 5) for the purpose of causing downward movement of armature 215 and clockwise movement of ejector lever 190. The closing of switch 113 to energize the solenoid coil 210 occurs after the closing of switch 112. The solenoid armature 215 does not move instantly upon closure of switch 113 because the solenoid is somewhat slow in acting and the moving parts operated by the solenoid have substantial inertia. Therefore there is time for the blade 52 to clear the tubing and for the cut tubing to be moved by the uncut tubing away from the cutter unit by the time the ejector starts moving to cause movement of the cut tubing bodily to the left in Fig. 9 away from the upper flange of the angle 180 whereupon the tubing drops into a suitable receptacle and the uncut tubing can move into engagement with the lever 146 whereupon the cycle is repeated.

This application is a continuation of our copending application Serial No. 43,103, filed August 7, 1948.

While the embodiment of the present invention as herein disclosed, constitutes a preferred form, it is to be understood that other forms might be adopted, all coming within the scope of the claims which follow.

What is claimed is as follows:

1. Apparatus for cutting tubing which is moved longitudinally by a feeding device, said apparatus comprising a tubing cutter movable transversely of the tubing, a shaft located parallel to the tubing, means supporting the shaft for axial and rotary movements, an abutment member attached to the shaft and located normally in the path of movement of the tubing at a predetermined distance from the cutter, a first device actuated by movement of the shaft axially in response to movement of the abutment member by the tubing for causing advancement of the cutter to cut the tubing, means actuated in response to advancement of the cutter to effect rotation of the shaft to move the abutment member away from the tubing, a spring released for operation in response to said retraction of the abutment member to return the shaft to normal axial position and consequently the abutment member back to a position alongside the cut tubing, said movement of the shaft releasing said first device, a second device actuated during advancement of the cutter for causing retraction of the cutter and release of said second device in consequence of which the cut tubing is moved by the uncut tubing away from the cutter, a second spring released upon retraction of the cutter for return of the member toward normal position, means for ejecting the cut tubing and a third device actuated by movement of the cutter for effecting operation of the ejecting means.

2. Apparatus for cutting tubing which is moved longitudinally by a feeding device, said apparatus comprising a servomotor having a movable member, a tubing cutter operated by the member, a first and second servomotor controlling devices respectively for effecting movement of the cutter toward and away from the tubing, a shaft located parallel to the tubing, means supporting the shaft for axial and rotary movements, an abutment member attached to the shaft and located normally in the path of movement of the tubing at a predetermined distance from the cutter, the first control device having an actuator located in the path of axial movement of the shaft which is moved in response to movement of the abutment member by the tubing whereby the first control device is rendered operative by movement of the shaft to cause the servomotor member to move in the direction to cause the cutter to sever the tubing, means actuated by the servomotor member while moving in said direction for effecting rotation of the shaft to move the abutment member away from the tubing, a spring released for operation in response to said retraction of the abutment member to return the shaft to normal axial position and consequently the abutment member back to a position alongside the cut tubing, said movement of the shaft releasing the actuator of the first control device, means operated by said servomotor member during the latter portion of its movement in said direction for causing the second control device to be rendered effective to cause the servomotor member to move in the opposite direction to retract the cutter and to release the actuator of the second control device in consequence of which the cut tubing is moved by the uncut tubing away from the cutter, a second spring released upon retraction of the cutter for return of the member toward normal position, means for ejecting the cut tubing, a third control device for causing operation of the ejecting means and means operated by the servomotor member after operation of the second control device for effecting operation of the third control device.

3. Apparatus for cutting tubing which is moved longitudinally by a feeding device said apparatus comprising a servomotor having a movable member, a tubing cutter operated by the member, a first and second servomotor controlling devices respectively for effecting movement of the cutter toward and away from the tubing, a rod located parallel to the tubing, means supporting the rod for axial and rotary movements, an abutment member attached to the rod and located normally in the path of movement of the tubing at a predetermined distance from the cutter, the first control device having an actuator located in the path of axial movement of the rod and moved in response to movement of the abutment member by the tubing whereby the first control device is rendered operative by movement of the rod to cause the servomotor member to move in the direction to cause the cutter to sever the tubing, means actuated by the servomotor member while moving in said direction for effecting rotation of the rod to move the abutment member away from the tubing, a spring released for operation in response to said retraction of the abutment member to return the rod to normal axial position and consequently the abutment member back to its normal position and alongside the tubing, said movement of the rod releasing the actuator of the first control device, means operated by said servomotor member during the latter portion of its movement in said direction for causing the second control device to be rendered effective to cause the servomotor member to move in the opposite direction to retract the cutter and to release the actuator of the second control device in consequence of which the cut tubing is moved by the uncut tubing away from the cutter so that the cut tubing can be ejected from the path of movement of the uncut tubing, a spring for rotating the rod back to its normal position thereby moving the abutment member into the path of movement of the uncut tubing, means for supporting the tubing between the cutter and the abutment member, means for ejecting the cut tubing laterally from the support, an ejector control device and means operated by the servomotor member for rendering the ejector control device effective to cause operation of the ejector.

4. Apparatus for cutting tubing which is moved longitudinally by a feeding device said apparatus comprising a servomotor having a movable member, a tubing cutter operated by the member, a first and second servomotor controlling devices respectively for effecting movement of the cutter toward and away from the tubing, a fixed base, a guide mounted on the base and extending parallel to the path of movement of the tubing, a plate supported by the guide for adjustment therealong, means for fixing the location of the plate along the guide, a rod supported by the plate for axial movement parallel to the tubing and for rotary movement, an abutment member provided by the rod and located normally in the path of movement of the tubing at a predetermined distance from the cutter as determined by the location of the plate along the guide, the first control device having an actuator located in the path of axial movement of the rod and moved in response to movement of the abutment member by the tubing whereby the first control device is rendered operative by movement of the rod to cause the servomotor member to move in the direction to cause the cutter to sever the tubing, means actuated by the servomotor member while moving in said direction for effecting rotation of the rod to move the abutment member away from the tubing, said means comprising a gear connected with the rod, a rack meshing with the gear and supported by the plate, a cam follower carried by the rack, a shaft parallel with the rod and rotated by the servomotor member, and a cam for engaging the follower and mounted on the shaft and connected therewith by a key received by a longitudinal groove of the shaft whereby the cam can be shifted along the shaft to make contact with the follower, a spring released for operation in response to said retraction of the abutment member to return the rod to normal axial position and consequently the abutment member back to its normal position and alongside the tubing, said movement of the rod releasing the actuator of the first control device, means operated by said servomotor member during the latter portion of its movement in said direction for causing the second control device to be rendered effective to cause the servomotor member to move in the opposite direction to retract the cutter and to release the actuator of the second control device in consequence of which the cut tubing is moved by the uncut tubing away from the cutter so that the cut tubing can be ejected from the path of movement of the uncut tubing, a spring which urges the follower toward the cam and the rod rotatively back to its normal position thereby moving the abutment member into the path of movement of the uncut tubing, and means for ejecting the cut tubing.

REA I. HAHN.
BERNARD E. FRANK.

References Cited in the file of this patent

UNITED STATES PATENTS

| Number | Name | Date |
|---|---|---|
| 1,626,878 | Seymour | May 3, 1927 |
| 2,205,389 | Borzym | June 25, 1940 |